(12) United States Patent
Phin et al.

(10) Patent No.: US 7,039,991 B2
(45) Date of Patent: May 9, 2006

(54) VEHICLE SAFETY DEVICE

(75) Inventors: David Donald Phin, Tayside (GB); Stewart Alasdair Liddell, Fife (GB)

(73) Assignee: Scott & Fyfe Limited, Fife (GB)

( * ) Notice: Subject to any disclaimer, the term of this patent is extended or adjusted under 35 U.S.C. 154(b) by 126 days.

(21) Appl. No.: 10/240,684

(22) PCT Filed: Apr. 6, 2001

(86) PCT No.: PCT/GB01/01577

§ 371 (c)(1),
(2), (4) Date: Dec. 18, 2002

(87) PCT Pub. No.: WO01/77429

PCT Pub. Date: Oct. 18, 2001

(65) Prior Publication Data

US 2004/0094942 A1    May 20, 2004

(30) Foreign Application Priority Data

Apr. 6, 2000 (GB) .................................... 0008547

(51) Int. Cl.
*D06C 7/00* (2006.01)
*D06C 3/00* (2006.01)

(52) U.S. Cl. .................. 26/81; 26/106; 28/142

(58) Field of Classification Search .................. 26/80, 26/81, 82, 83, 84, 85, 72, 71, 51, 106, 87, 26/92; 28/142, 165; 66/169 R, 170, 202, 66/8; 442/304, 312, 308, 306; 428/34.9, 428/35.1, 35.2, 35.5, 36.1; 280/728.1, 743.1

See application file for complete search history.

(56) References Cited

U.S. PATENT DOCUMENTS

| 2,109,469 | A | * | 3/1938 | Cohn et al. ..................... 26/56 |
| 3,204,317 | A | * | 9/1965 | Hurt et al. ..................... 26/55 |
| 3,626,714 | A | * | 12/1971 | Blore .......................... 66/196 |
| 3,762,003 | A | * | 10/1973 | Frezza ........................... 26/81 |
| 4,133,191 | A | * | 1/1979 | Blore et al. .................. 66/197 |
| 4,134,188 | A | * | 1/1979 | Bryan ......................... 26/18.5 |
| 4,876,774 | A | * | 10/1989 | Kavesh et al. ................ 28/166 |
| 5,322,322 | A | * | 6/1994 | Bark et al. ............... 280/730.2 |
| 5,385,367 | A | * | 1/1995 | Tanaka et al. .............. 280/733 |
| 5,630,261 | A | * | 5/1997 | Beasley, Jr. .................. 28/104 |
| 5,916,830 | A | * | 6/1999 | Graham ..................... 442/314 |
| 6,016,591 | A | * | 1/2000 | Strudel et al. ................. 26/81 |
| 6,776,014 | B1 | * | 8/2004 | Laycock et al. .............. 66/198 |

FOREIGN PATENT DOCUMENTS

EP     965670 A2  * 12/1999
GB    2339557 A  *  2/2000

* cited by examiner

Primary Examiner—A. Vanatta
(74) Attorney, Agent, or Firm—Volpe and Koenig, P.C.

(57) ABSTRACT

An inflatable element in the form of a tension tube, and method of making same. The method involves forming a tube by a knitting process, then heatsetting the tube whilst simultaneously maintaining it under lengthwise tension. The tension in the tube is maintained during cooling of the tube. An option relaxation stage may also be included.

18 Claims, 2 Drawing Sheets

VEHICLE SAFETY DEVICE

Figure 1:
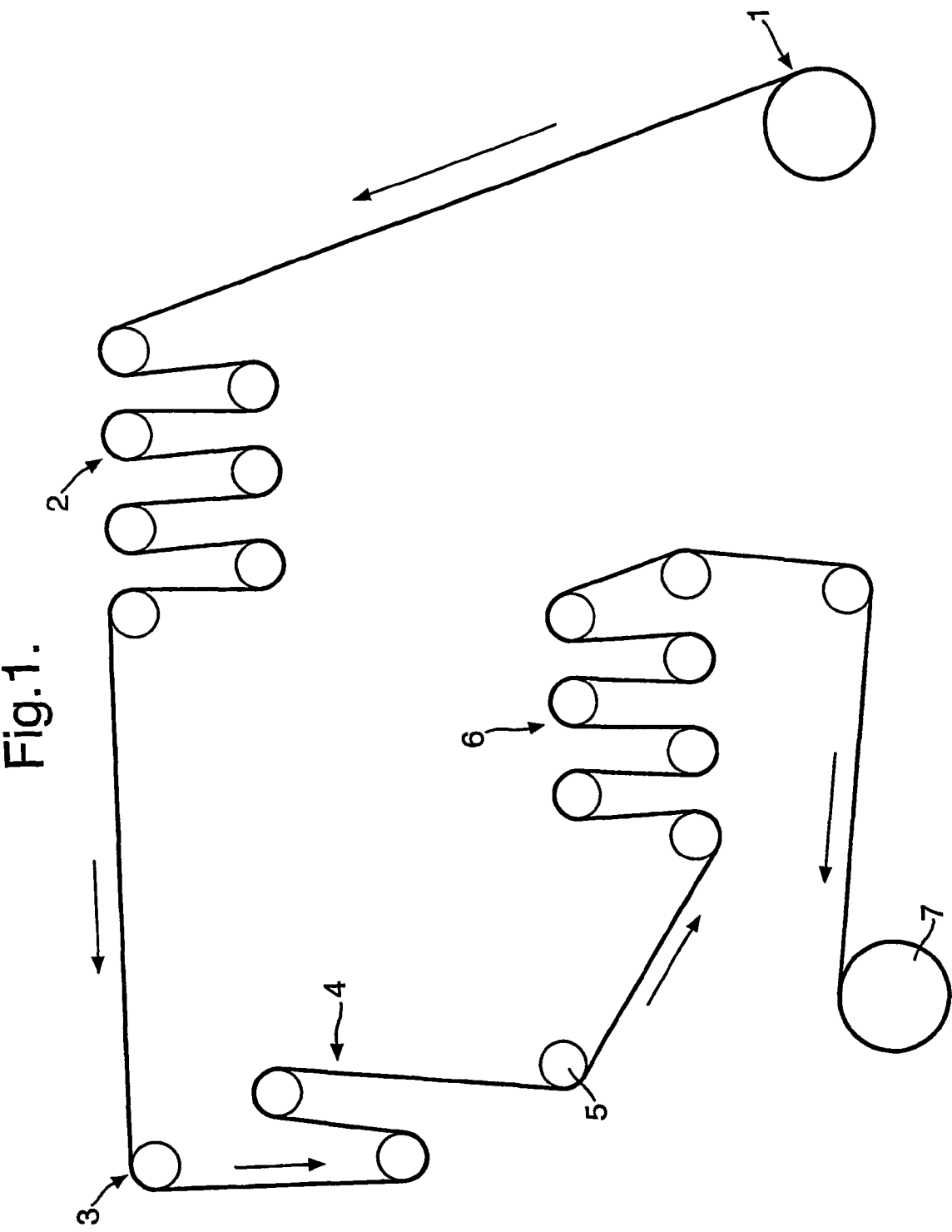

This invention relates to a vehicle safety device and to a method of manufacturing such a device.

The present invention is concerned particularly with safety devices of the type described in U.S. Pat. No. 5,322,322. This patent discloses a safety device for fitting in a vehicle side window and which, when inflated, will stretch across the window to prevent the occupant passing through the window in the event of an accident. The described device comprises an inflatable element in the form of a braided tube, which is attached at spaced points on opposite sides of the vehicle window and is normally located out of sight in the window frame. Upon detection of a side impact, the braided tube is inflated, causing its diameter to increase, and its length to decrease. As a result it becomes stretched between its mounting points and these are positioned so that the inflated tube stretches taut across the window in a semi-rigid state to protect the occupant in the manner described.

The present invention is directed towards the inflatable element which is used in devices such as described in U.S. Pat. No. 5,322,322. Although the primary intended use for such elements is in vehicle safety devices, particularly for side impact protection, it is not intended that the inflatable elements of the present invention be limited to such use.

In general terms such inflatable elements comprise a tubular structure made from yarn and means for inflating the tubular structure such that it simultaneously increases in diameter and decreases in length. The decrease in length is constrained so as to generate a tension or load which renders the element semi-rigid, once inflated. The inflating means may comprise a web of flexible material which is formed by impregnating the tubular structure with resin. Alternatively, a separate impermeable bag or bladder may be inserted within the tubular structure for the same purpose.

One problem with the braided tubes described in U.S. Pat. No. 5,322,322 is that they are effectively limited to single tube systems because it is not yet possible to braid a double or triple tube or to form integral webs attached to the tube.

Another difficulty is that it is not possible to form discrete openings in the tube, other than by forcing a hole between the threads of the braid. Such openings might, for example, be necessary in order to enable insertion of a bladder if the ends of the tube are closed, or to enable a bladder fixing strap to be taken out through the tube wall to prevent it moving, or to hold it in a fixed position.

As a general matter, the braid structure is very loose and significant openings can easily be made, either accidentally or deliberately, by slightly working the yarns apart. This can in turn lead to problems with the bladder protruding through the braid in the manner of an aneurysm.

Such difficulties can be overcome by manufacturing the inflatable element by a knitting process.

British Patent No. 2339557 describes an inflatable element for side impact safety devices which comprises a knitted tubular structure having a diamond pattern of knitting which attempts to emulate the braided structure described in U.S. Pat. No. 5,322,322. It is not clear, however, how such a structure generates load on inflation to become a semi-rigid structural member, which is what is required to form an effective barrier across the window in an impact.

The present invention seeks to provide an inflatable element which performs to the requirements of a tension generating tubular assembly.

According to a first aspect of the invention there is provided an inflatable element comprising a tubular body of knitted fabric and means for inflating the tubular body, said tubular body being formed from a tube made by knitting using synthetic yarn, followed by a tensioning and setting operation intended to improve the strength and tension generating performance of the knitted tube during inflation.

According to a second aspect of the invention there is provided a method of making an inflatable element comprising a tubular body of knitted fabric and means for inflating the tubular body, said method comprising forming a tube by a knitting process using synthetic yarn, thence subjecting the knitted tube to tension and setting processes to improve the strength and tension generating performance of the knitted tube when inflated.

The inflatable element of the invention preferably takes the form of a tension tube, by which is meant a tubular assembly which, upon inflation, will be subject to an increase in diameter and a decrease in length such that, if the length is constrained, then the tube will generate tension or load between the constrained ends. This tension or load is necessary for the tube to provide the necessary semi-rigid structural member in its application as a vehicle side impact safety device.

A tension tube made simply by a knitting process, such as described in GB 2339557, will generate a degree of tension between its constrained ends on inflation; however, the reduction in length and development of load are not of sufficient magnitude for use in commercial applications. To produce a knitted structure with the characteristics required for use in commercial applications, the knitted tube is, in accordance with the invention, subject to a tensioning and setting process to ensure that the yarns making up the knitted structure are set in a geometric configuration which is best suited to the generation of tension during inflation. A preferred knitting pattern would be 2:1 Tricot and 1:1 Tricot; however, other knitting patterns could be used to produce a similar effect.

The yarn used to fabricate the tube is synthetic yarn, for example polyester, and is preferably of the multifilament type. However, yarns of other synthetic materials could be used, provided that the heat setting conditions are varied appropriately. Examples are nylon, polypropylene, viscose and HMWHDPE.

A tension tube, whether it be braided or knitted is made up from a multiplicity of yarns which are in such a form that, as the tube increases in diameter during inflation, then the angle of the yarns within the structure changes. As the angle increases relative to the longitudinal axis of the tube then the tube will reduce in length. If however the tube is held at each end so that its length cannot reduce, then the inflation forces the tube to tighten, thus generating tension within the tube because the tube is not permitted to shorten, as it would like.

It is believed that the angular change of the yarns will be most effective in generating tension until they reach an angle of about 45°.

Figure 2:
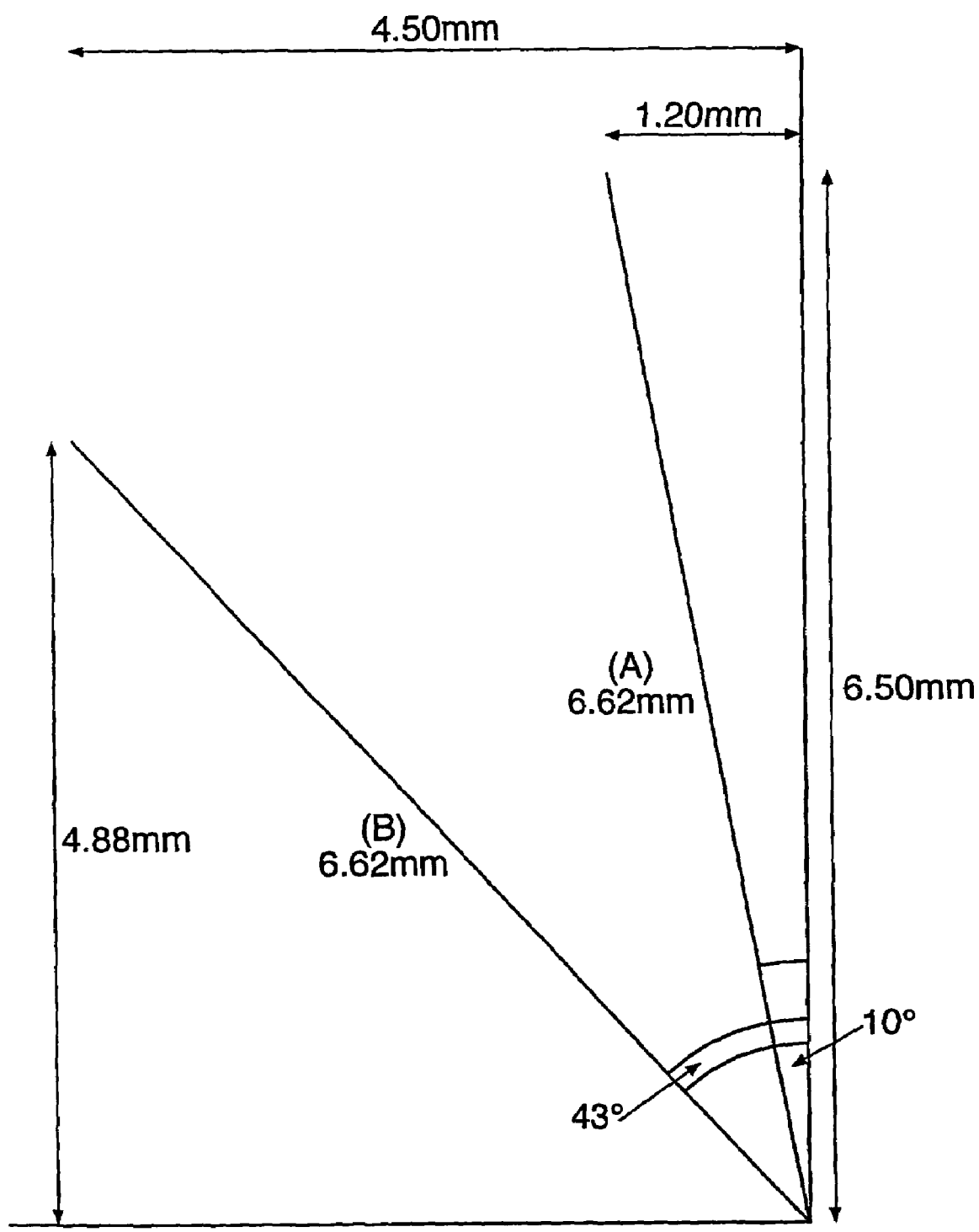

The angles of the yarns of a typical example of a knitted and set tube are illustrated in FIG. 2 which is orientated so that the vertical axis of the drawing is parallel with the longitudinal axis of the tube. As can be seen, the starting angle might be around 10° with a stitch length of 6.62 mm. The distance between the rows of stitches in the machine direction will be approximately 6.5 mm; the starting circumference is approximately 104 mm. During inflation the circumference increases; as the circumference is increased to 385 mm the angle of the yarn will now be around 43° and the distance between the rows of stitches will have reduced to approximately 4.9 mm. Since the tube is manufactured from synthetic yarns which have an elastic modulus, the whole tube will also want to extend under the aforesaid tension as the diameter increases.

In a particular embodiment of the invention, the tube is knitted on a Raschel double needlebed knitting machine using 1100 DTEX polyester multifilament yarn. The machine used is 9 gauge and the tube is knitted using 44 needles on each bed. The fabric construction is 2:1 Tricot and 1:1 Tricot with a stitch length of 6.75 mm.

The knitted tube is next subjected to a heating and setting operation by being passed over heated rollers whilst being simultaneously held lengthwise under tension. The tube is allowed to cool whilst maintaining the tube under tension. After cooling, the tension is released. If a low residual heat shrinkage at elevated temperatures is required, then a relaxation stage may be included in the setting operation.

When the tube comes off the knitting machine it has a fairly unstable structure composed of rows of loose stitches, the legs of which are significantly curved. The subsequent setting operation has the effect of compacting the structure, straightening the legs and aligning them in predominantly the machine direction—i.e. along the longitudinal axis of the tube. The knitted tube has a significant amount of slack in the system due to the nature of the knitting process and the setting process is vital in minimising this slack because it has the effect of permanently aligning the yarns in the optimum direction.

The finished tube is cut to a length determined by the particular application to which it is to be put. For example, for the application in a side impact vehicle safety device, the length is dictated by the dimensions of the window in which it is to be fitted. Typical lengths for this purpose are in the range 1300 mm to 2000 mm. Cutting of the tube can be achieved in various ways, but preferably the cut ends are sealed to prevent fraying.

For example a heated knife can be used to both cut the tube into lengths and to seal the cut ends. Preferably the tube is left open at at least one end to enable insertion of a bladder. If both ends are left closed however, the bladder can be inserted through a hole or holes specially knitted in the tube for the purpose.

The temperature to which the tube is raised during the setting operation, and the tension applied will depend upon the materials used and the ultimate properties required. Typically for polyester yarns, the heated rollers can be at a temperature of 230° C. and the tube can be held at a tension of 100 Kgs.

During the setting operation the individual yarns within the knitted tube become set in the alignment most suited for the tube to reduce in length and, if constrained, to generate tension during inflation.

EXAMPLE

A tension tube of 1710 mm length manufactured by the above-described method had a starting diameter of 32 mm and was constrained at its ends at a fixing pitch of 1595 mm. An inflatable bladder incorporated in the tube was then inflated to a pressure of 2.2 Bar and a diameter of 120 mm. Under these conditions a tension of 500 Kgs was generated between the fixed ends of the tube.

A feature of the knitting process is that multiple tubes and complex tubular structures can be knitted which have discrete openings and areas for inflation. Furthermore the tubular structure can be knitted together in specific areas to produce single fabric if localised strengthening or seaming is required.

In an embodiment of the invention, the inflated shape of the inflatable element is varied by selectively increasing or reducing the stitch length within the knitted tube so that the effective diameter of the inflatable element will either be increased or decreased in the area where the stitch length has been varied.

It will also be apparent that, for a given number of knitting needles in a given structure, by modifying the stitch length the effective diameter can be varied as described above and, in addition, the tension generating capability will be altered. In general increasing the stitch length will increase the effective diameter and also the load generating capability at a given inflation pressure.

In order that the invention may be better understood, an embodiment thereof will now be described, by way of example only and with reference to the accompanying drawings in which:

FIG. 1 is a schematic view of an apparatus suitable for carrying out the method of the invention; and FIG. 2 is a diagram intended to assist the explanation of the variation of yarn angle during inflation.

Referring to FIG. 1 there is shown one example of heat setting equipment for providing the setting operation on the knitted tube. It is assumed that the knitted tube has already been manufactured in the manner already described and is rolled up on a roller 1; however, the process could of course be continuous.

From the roller 1, or other let-off mechanism, the knitted tube is fed at a controlled pre-tension to a set 2 of driven rollers running at a fixed speed, typically 400 mm/min. The tube then passes round a guide roller 3 and then round two heated rollers 4 arranged so that first one surface, then the opposite surface, come into contact with the heated surface of a roller. The rollers 4 typically have a surface temperature of about 230° C., but this will depend upon the system parameters such as throughput speed, roller diameter, arc of contact etc. With the currently used yarn (polyester), the equipment should be arranged such that the body of the tube attains a minimum temperature of 165° C., but this will vary according to the yarn used.

The knitted tube next passes round roller 5 which is attached to a load cell (not shown), and then to further driven rollers 6. The speed of rollers 6 is automatically controlled by the load cell attached to roller 5 so as to maintain a substantially constant tension—typically 100 Kgs—between the rollers 3 and 5, i.e. during heating. After passing over the heated rollers 4, the tube is allowed to cool down to ambient temperature, but whilst still under tension, as it passes over rollers 5 and 6. Finally, the now-heatset tube is rolled up on a roller 7, or otherwise packed off.

If a relaxation step is required (see above) this is carried out after the setting process and again involves passing the tube around a further set of heated rollers at a reduced temperature, typically around 170° C., and a reduced tension which could be as low as 10 Kgs, depending on the properties required. This relaxation procedure will require that the final output speed will be less than the output speed from the setting section.

During the setting operation there are a multitude of things happening:

the tube is being stretched due to the tension and heat;

the tube is increasing in length and reducing in width due to the straightening of the legs of the stitches and the locking of the stitches in the machine direction;

the tube is reducing in length due to thermal shrinkage of the yarn;

the tube is increasing in strength due to a normalising of the stitches within the tube structure so that an applied load will be more evenly spread across all of the construction yarns.

Apertures can readily be made in the tube wall by simply knitting the yarns into an aperture. The normal knitted tube which is constructed from multiple rows of multiple stitches does not have any holes of significant size and cannot be readily forced into significant apertures, except by cutting the yarns. These are significant advantages over a braided tube which, as mentioned above, can readily form apertures large enough to cause the bladder to protrude.

The invention claimed is:

1. A method of making a tension tube, said method comprising:

forming a tube by a knitting process using synthetic yarn;

heating the knitted tube to a first temperature and generally simultaneously tensioning the tube in a lengthwise direction to a first tension value to achieve a setting of the knitted tube; and after heating the knitted tube to the first temperature, heating the tube to a second temperature lower than the first temperature and generally simultaneously tensioning the tube in a lengthwise direction to a second tension value lower than the first tension value to achieve a relaxation of the knitted tube, whereby the strength and tension generating performance of the knitted tube when inflated is improved.

2. The method of claim 1, further including the subsequent step of allowing the knitted tube to cool whilst maintaining the tube under lengthwise tension.

3. The method of claim 2, wherein, after cooling to approximately ambient temperature, the lengthwise tension is released.

4. The method of claim 1, wherein the heating steps comprise passing the knitted tube over one or more heated rollers.

5. The method of claim 1, further comprising, after the setting and relaxation processes, cutting the knitted tube to a desired length to form at least two tubular bodies.

6. The method of claim 1, wherein the forming includes forming the tube using a multifiliment yarn.

7. The method of claim 1, further comprising providing the synthetic yarn with at least one of the following materials: polyester, nylon, polypropylene, viscose and high molecular weight polyethelyne.

8. The method of claim 1, wherein the knitting process for forming the knitted tube includes forming at least one aperture in the wall of the knitted tube.

9. The method of claim 1, further comprising varying the stitch length during the knitting process to give a particular desired shape to the finished tension tube.

10. The method of claim 1, further comprising inserting at least one of an impermeable bag and a bladder into the knitted tube.

11. The method of claim 1, further comprising impregnating the knitted tube with a resin.

12. The method of claim 8, further comprising inserting at least one of an impermeable bag and a bladder into the knitted tube through the at least one aperture.

13. The method of claim 1, wherein the forming of the knitted tube includes forming a plurality of tube portions and knitting the portions of the tube together.

14. The method of claim 1, wherein the heating of the knitted tube to the first temperature includes running the knitted tube over rollers heated at approximately 230 C, and wherein the tensioning the knitted tube to a first tension value includes holding the knitted tube at a tension of approximately 100 Kgs.

15. The method of claim 14, wherein the heating of the knitted tube to the second temperature includes running the knitted tube over rollers heated at approximately 170 C, and wherein the tensioning the knitted tube to a second tension value includes holding the knitted tube at a tension of approximately 10 Kgs.

16. A tension tube made by the method of claim 1.

17. A tension tube made by the method of claim 10.

18. A tension tube made by the method of claim 11.

* * * * *